United States Patent [19]

Yamashiro et al.

[11] Patent Number: 4,714,506

[45] Date of Patent: Dec. 22, 1987

[54] METHOD FOR MAKING A DUNNAGE SHOCK ABSORBER

[76] Inventors: Hiroshi Yamashiro, 5-15-13 Kamiva, Setagaya-ku, Tokyo; Ko Suzuki, 984-9 Kamigo, Ebina-shi, Kanagawa Prefecture, both of Japan

[21] Appl. No.: 742,091

[22] Filed: Jun. 6, 1985

Related U.S. Application Data

[63] Continuation-in-part of Ser. No. 725,244, Apr. 19, 1985, abandoned, which is a continuation of Ser. No. 476,497, Mar. 18, 1983, abandoned.

[30] Foreign Application Priority Data

| Jul. 1, 1982 | [JP] | Japan | 57-98267[U] |
| Jul. 10, 1982 | [JP] | Japan | 57-104753[U] |
| Sep. 24, 1982 | [JP] | Japan | 57-164885 |
| Jul. 13, 1984 | [JP] | Japan | 59-145417 |

[51] Int. Cl.⁴ ............................................. B32B 31/14
[52] U.S. Cl. .................................. 156/80; 156/145; 156/147; 156/244.14; 156/250; 156/253; 428/12; 428/178; 53/451; 53/551; 53/552
[58] Field of Search ............ 156/80, 145, 147, 244.14, 156/250, 253, 553; 428/12, 178; 53/451, 551, 552

[56] References Cited

U.S. PATENT DOCUMENTS

| 3,090,175 | 5/1963 | Berglund | 156/251 |
| 3,226,285 | 12/1965 | Iovenko | 428/178 |
| 3,347,363 | 10/1967 | Dykes et al. | 53/451 |
| 3,703,430 | 11/1972 | Rich | 156/553 |
| 3,900,356 | 8/1975 | Koch et al. | 156/145 |
| 4,076,121 | 2/1978 | Clayton et al. | 206/390 |
| 4,076,872 | 2/1978 | Lewicki et al. | 428/12 |
| 4,553,887 | 11/1985 | Reeves | 156/145 |
| 4,564,407 | 1/1986 | Tsuruta | 156/147 |

*Primary Examiner*—Caleb Weston
*Attorney, Agent, or Firm*—Niro, Scavone, Haller & Niro

[57] ABSTRACT

A dunnage shock absorber and a method and apparatus for making the same is disclosed. The shock absorber is constructed from plastic material which forms a series of trigonal-shaped, gas-filled units which maintain adequate shock absorbing characteristics over a broad range of temperature conditions. This disclosed method includes the steps of forming a plastic tubular body, introducing a cooled gas into the body and forming individual trigonal-shaped units having cooled gas entrapped through angularly heat sealing the edges of such units. The disclosed apparatus forms plastic film into a series of gas-filled trigonal units through the use of fin seal rollers to seal the film into a tubular body. Sponge-like rollers downline of the fin seal rollers grip the tubular body and a conduit injects cooled gas into the tubular body. Horizontal and vertical sealers are provided downline of the sponge-like rollers to heat seal the tubular body with gas entrapped therein.

14 Claims, 13 Drawing Figures

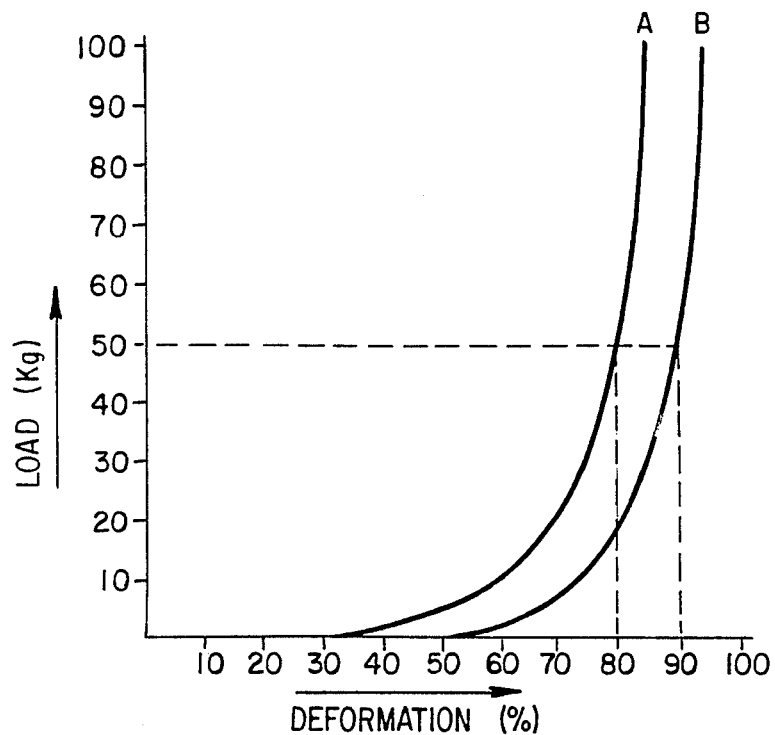
FIG. 12 LOAD DEFORMATION
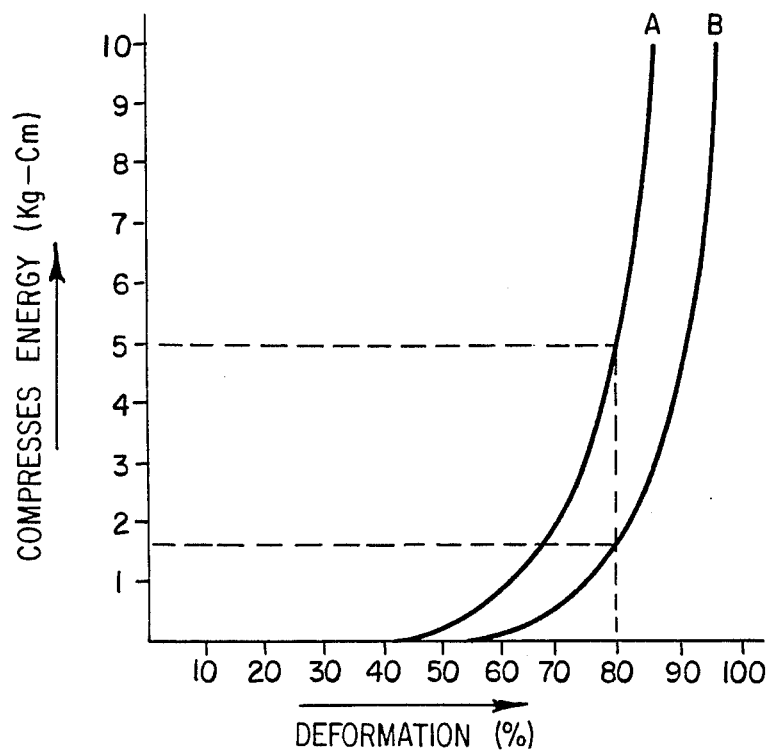
FIG. 13 COMPRESSED ENERGY DEFORMATION

METHOD FOR MAKING A DUNNAGE SHOCK ABSORBER

RELATED APPLICATIONS

This application is a continuation-in-part of application Ser. No. 725,244 filed Apr. 19, 1985 abandoned, which, in turn is a continuation of application Ser. No. 476,497, filed Mar. 18, 1983 abandoned, claiming the benefit of the filing dates of Japanese Utility Model Application No. 57-98267 filed July 1, 1982; Japanese Utility Model Application 57-104753 filed July 10, 1982; and Japanese Patent Application No. 57-164885 filed Sept. 24, 1982 as provided in 35 U.S.C. 119, and now abandoned. Priority is also claimed with respect to Japanese Patent Application No. 59-145417 filed July 13, 1984.

TECHNICAL FIELD OF THE INVENTION

The present invention relates to plastic shock absorbing packing materials or dunnage and to a method and apparatus for making such shock absorbing packing materials from plastic film. More specifically, the invention relates to packing materials having bulbous, expanded, hollow units in which gas is entrapped and to a method and apparatus for forming such materials.

BACKGROUND OF THE INVENTION

In the prior art, various forms of plastic shock absorbing materials are known, including non-hollow bodies having a spherical or spaghetti shape that are made from foamed plastics. Such packing materials do not provide integrated shock absorbing action and often act hydrodynamically, thus permitting the packed object to be subjected to undesired movement and vibration as the packing material itself deforms. In addition, such materials often provide unsatisfactory shock absorbing characteristics, are difficult to handle and are expensive due to the additional plastic material that is necessary because of the non-hollow nature of the packing material.

Alternatively, those prior art packing materials that attempt to use a hollow, rather than a foamed body, have shapes that do not easily permit the complete and efficient filling of voids around the object to be packed and do not maintain fully adequate shock absorbing capabilities over a wide range of shipping temperatures. As a consequence, more working units are required, and decreased shock absorbing compression and deformation characteristics result.

SUMMARY OF THE INVENTION

In accordance with the present invention, a shock absorber packing material is provided that is constructed from a plastic film material and includes a series of essentially trigonal shaped, gas-filled units that are heat sealed and are capable of efficiently filling the areas around the object to be packed and of also maintaining adequate shock absorbing characteristics over a broad range of temperature conditions. A desirable method of making such packing materials involves the formation of a plastic tubular body, the introduction of a cooled gas into the tubular body and the formation of essentially trigonal shaped individual units containing entrapped gas by angularly heat pressing heat sealing the tubular body at spaced intervals. An apparatus also is provided for forming a plastic film into a series of gas-filled essentially trigonal-shaped units through the use of fin seal rollers for sealing the overlapping side edges of the film to form a tubular body, sponge-like or deformable rollers forward or down line of the fin seal rollers for gripping the side portions and advancing of the tubular body downline, a conduit for injecting cool gas into the tubular body, and lateral or horizontal and vertical sealers located in series, downline of the sponge-like rollers to heat seal the tubular body into a preferred shape for packing and shock absorbing efficiency.

It is, therefore, an object of the present invention to provide shock absorber packing materials that provide a superior shock absorbing and packing action achieved in one body by a plurality of linked units containing a gas.

It is another object of the present invention to provide shock absorber material that can be mass-produced at low cost by simplified equipment.

It is still a further object of the present invention to provide packing material of high bulk and capable of efficiently filling the void areas around the object that is packed, thereby reducing the unprotected areas around the packed object.

It is still a further object of the present invention to provide packing material that is capable of maintaining its highly desirable shock absorbing characteristics over a wide range of operating temperatures.

Moreover, the method and apparatus for making the subject packing materials are economical, operate at improved manufacturing speeds and are capable of efficiently manufacturing highly desirable packing materials that provide improved packing and shock absorbing characteristics.

These and other objects of the present invention together with the advantages thereof will become apparent to those skilled in the art from the detailed disclosure of the present invention as set forth below.

BRIEF DESCRIPTION OF THE DRAWINGS

Embodiments of the present invention are illustrated in the drawings as described generally below.

FIG. 12 graphically illustrates the deformation levels of a shock absorber packing material of the present invention in which the gas filled units contain gas injected at ambient temperature versus a more desirable temperature 22° C. below ambient conditions.

FIG. 13 graphically illustrates the compressed energy levels for shock absorber packing materials containing gas injected at ambient versus 22° C. below ambient conditions.

DETAILED DESCRIPTION OF THE INVENTION

Figure 1:
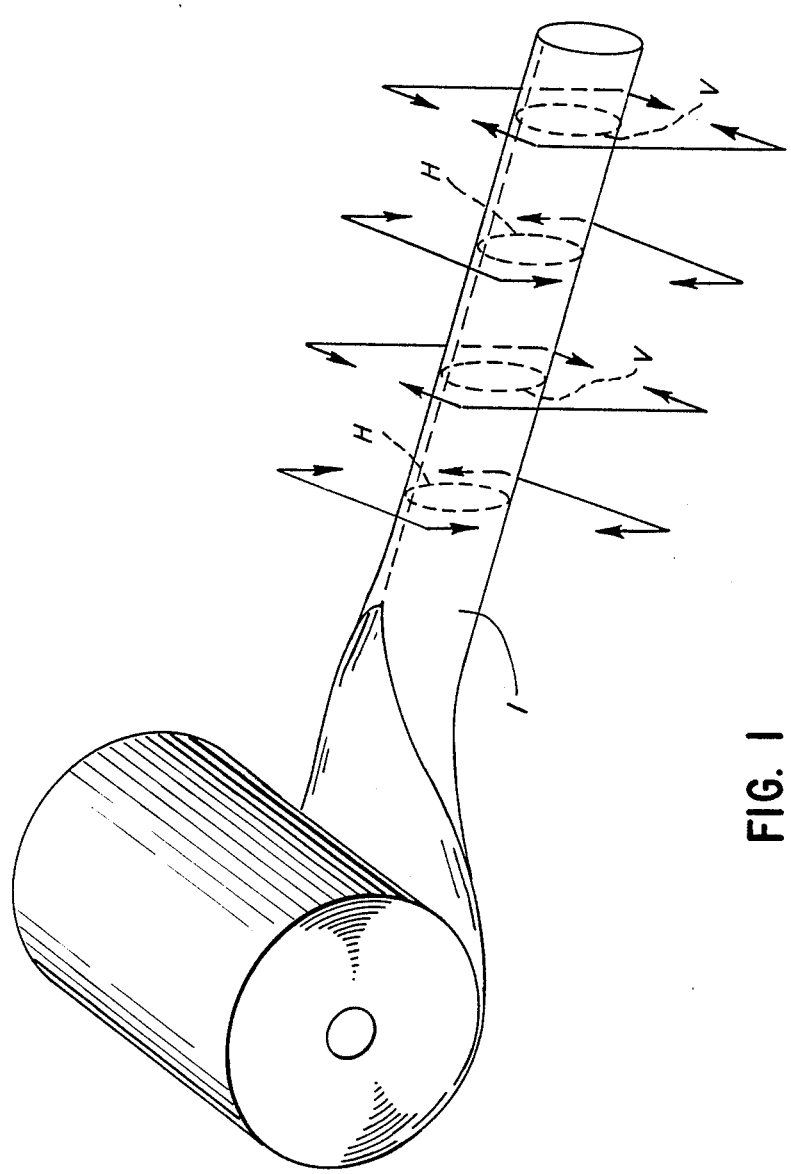
FIG. 1 and FIG. 2 are schematic illustrations showing an embodiment of a production process and method of making a shock absorber packing material of the present invention from plastic sheet material.

Although any number of plastic films may be useful in the practice of the present invention, a laminated film made up of two kinds of plastics which have different melting points is preferred. Plastic films are selected on the basis of strength, elasticity and melting point considerations. Most preferably, a laminated film composed of polyethylene and polyester or polyamide (nylon) is employed. The thickness of the film is not limited, in particular, and normally can be selected from a range of from about 10 to about 50 microns for polyethylene, about 10 to about 20 rons for polyester and about 10 to about 20 microns for polyamide. Most desirably, however, it has been found that films in the thickness range of 9 to 30 microns is most desirable because at levels below 9 microns the film is generally too weak and at levels above 30 microns too expensive. When a polyethylene-polyethylene terephthalate film is used a combined thickness in the range of 12 to 30 microns is used. When a three layer film of low density polyethylene, high density polyethylene and polyethlene terephthalate is used at 10-10-12 micron film thicknesses respectively, a total thickness of 32 microns is used.

As an example, a co-extrusion plastic film manufactured by Dai Nippon Printing Company, and formed from linear low density polyethylene having a melting point between about 160° C. to 180° C. and a polyethylene terephthalate having a melting point between about 230° C. and 240° C., bound together with a low density polyethylene glue has been found desirable as a film material useful in the practice of the present invention. The lower melting point polyethylene assists in forming the seal in the resultant product while the polyethylene terephthalate assists in maintaining a web. The use of composite films made up of separate films having different melting points assists in providing proper sealing and forming characteristics for the resultant packing material.

The diameter of the cylindrical body used in forming the packing material structure of the present invention is not specifically limited and is normally selected from a range of about several centimeters to several tens of centimeters, more preferably 4 to 10 centimeters. Moreover, heat-pressing or heat sealing is preferably made at intervals ranging from several centimeters and several tens of centimeters, more preferably 4 to 10 centimeters.

Although any number of inert gases may be desirably used in the practice of the present invention, air is most preferably used because it is so readily available and inexpensive. Alternatively, nitrogen may be used because it is obtainable in liquid form, is inexpensive and in liquid form is in a cooled condition ready for injection without additional cooling. A gas controlled to be cooler than the ambient air temperature, more preferably cooler by about 10° C. to 20° C. or more than the ambient air temperature, gives the desired satisfactory shock absorbing results. That is, in cases where the temperature of the gas sealed in a cylindrical body is equal to that of the open air, e.g. ambient conditions, the gas somewhat expands with heat at the time of heat-pressing. Therefore, when the temperature inside the hollow units formed by vertical and horizontal heat-pressing becomes equal to that of the open ambient air, the hollow units can somewhat deflate. In contrast, when a gas controlled to be cooler than the open air is contained, in time the temperature inside the hollow units is elevated to that of the surroundings to thus allow the gas to expand. As a result, the hollow units swell to be roundish, giving far superior shock absorbing effects.

More specifically, it has been determined that the temperature differential between the ambient conditions at which processing normally takes place and the temperature at which the gas is injected to form the hollow, gas-filled units can affect the properties of the resultant plastic shock absorbing packing material. Most desirably, the temperature differential should be sufficient to provide a fully swelled, rigid unit structure with resultant high shock absorbing characteristics over a wide operating range of packing conditions. For example, a temperature difference of 0° C. typically provides poor unit elasticity and shock absorption characteristics, while temperature differences of 5° C. although improved are still typically not preferred. At 10° C. temperature differentials the gas-filled units typically achieve a roundish shape with adequate shock absorption. At 15° C. temperature differentials unit swelling is improved still further as is shock absorption. And, at temperature differentials of 20° C. the shape of the gas-filled units is rigid and desirable shock absorption characteristics are achieved. Temperatures differences even greater than 20° C. produce highly satisfactory results, but are typically not desired because of the added expense associated with the need to further cool the injected gas.

Naturally, because it is difficult to create a pressurized condition in the individual gas-filled units through injection of gas at pressures above atmospheric conditions, the injection of a chilled gas (such as air) at or slightly above atmospheric conditions, which is then allowed to increase in temperature to individually pressurize the gas-filled units, has been found particularly desirable. Typically the contained gas is injected at a pressure slightly higher than atmospheric pressure, between about 10 mm of water to 100 mm of water and most preferably between about 20 and 35 mm of water. At pressures above 100 mm of water it becomes more difficult to properly seal the individual units, while at pressures below 10 mm of water it sometimes becomes more difficult to properly expand the individual units into their properly inflated bulbous condition.

An additional benefit of the use of cooler gas is that it tends to increase the productivity of the packing material manufacturing process since the chilled gas tends to permit more rapid cooling of the heat seals, e.g. the melted seam portions forming the boundaries for each sealed gas-filled unit, and thus accelerates adherence of the seam. As a consequence, it has been determined that at ambient operating conditions of 32° C. (as a base condition) increases in production of 9 percent have been achieved at 12° C. temperature differentials, 15 percent at 17° C. temperature differentials, 23 percent at 22° C. temperature differentials and 54 percent at 32° C. temperature differentials.

Although heat-pressing can take place at varying angular configurations, heat-pressing is desirably effected substantially vertically and horizontally. More preferably, the heat-pressing should be made alternatively vertically and horizontally. The hollow units thus obtained are of trigonal shape and generally swollen and roundish in cross-section when containing a gas cooler than the ambient air. The trigonal shape is superior in bulkiness which leads to an increase in desired packing characteristics which includes reducing attenuating and preventing motion of the surrounded objects.

Heat sealing of the individual units is desirably carried out at temperature and pressure conditions that provide an acceptable seal capable of containing the injected gas. When a laminated, composite film is used, the sealing temperature is at least higher than the melting point of the lower melting temperature plastic component, but below the melting point of the higher melting temperature component. Thus, only partial melting of the two or three component plastic film takes place, e.g. only one component melts. In the case of a polyethylene-polyethylene terephthalate composite film, for example, a range of about 130° C. to about 180° C. is an acceptable sealing temperature, while a range of about 160° C. to about 180° C. is preferable. At temperatures above about 180° C. the polyethylene terephthalate component would be damaged, while at temperatures above about 230° C. the polyethylene component would be damaged. Heat pressing pressures are typically set as low as possible to achieve quality sealing. If a long dwell period is used, pressures can be set quite low, e.g., below about 4 kg/cm$^2$. At pressures above about 10 kg/cm$^2$ the edge portion of the seals can be damaged.

Figure 3:
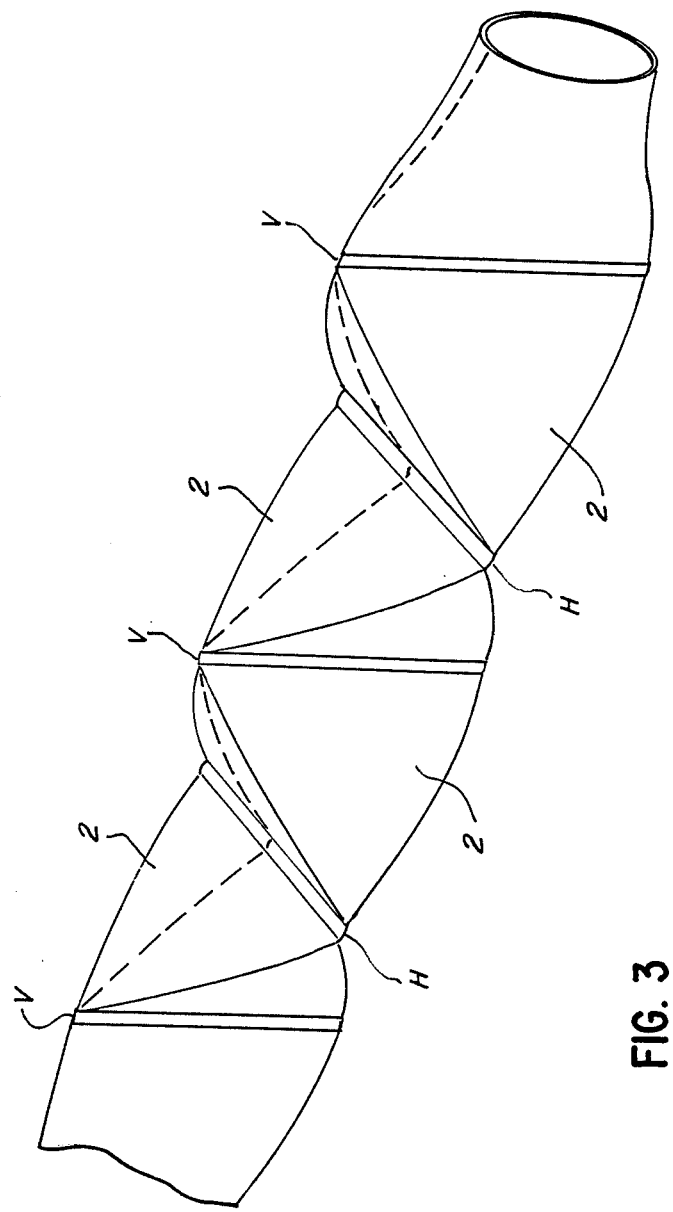
FIG. 3 is a perspective view of an embodiment of the shock absorber packing material of the present invention.
Figure 4:
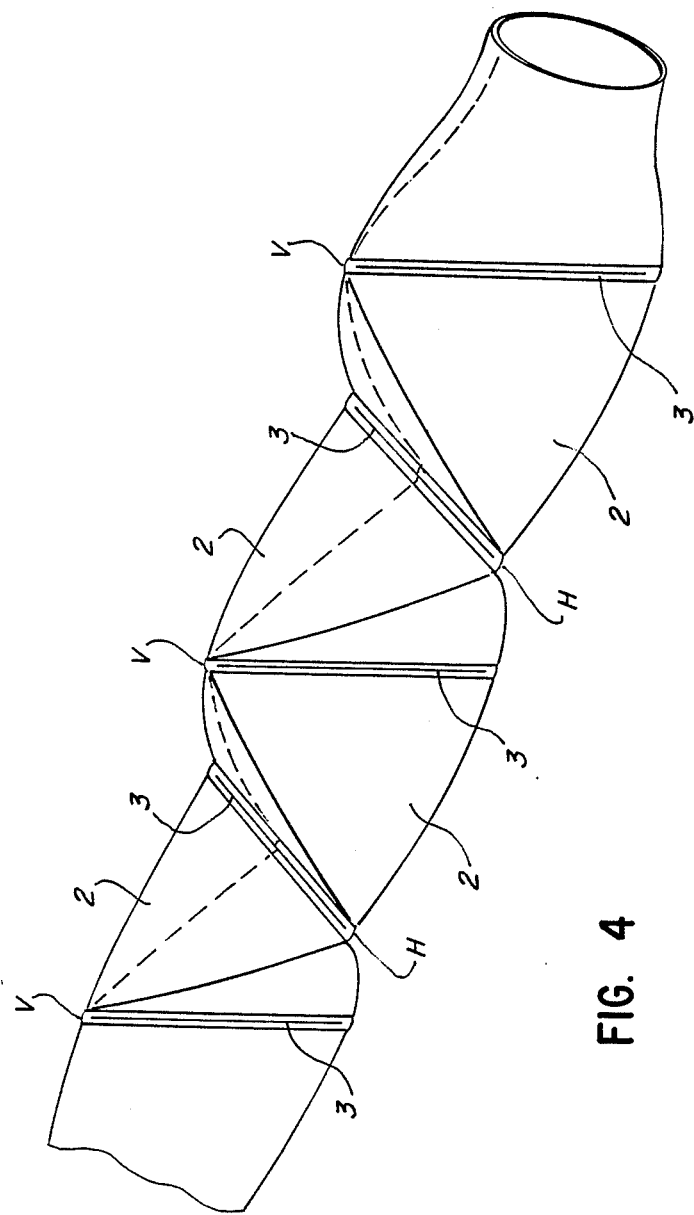
FIG. 4 is a perspective view of an embodiment of the shock absorber packing material having a cut or score in a heat-pressed portion thereof.
Figure 10:
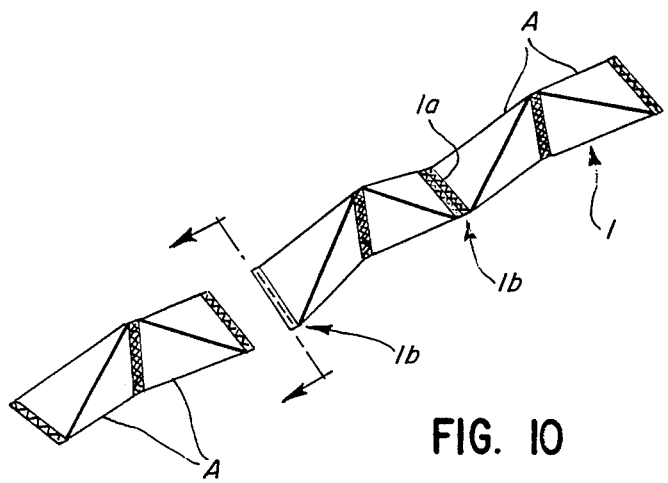
FIG. 10 illustrates an embodiment of the desired packing material made by the apparatus and method illustrated in FIGS. 6 through 9.

The essentially trigonal shape shown in FIGS. 3, 4 and 10 provides a highly efficient packing and shock absorbing product. The linked units, in series for example, provide a high degree of shock absorbency and aid in filling the corners of the packing container. In addition, the essentially trigonal shape helps to completely surround the packed object, reduces voids in the packing container and fits easily into corner areas as shown, for example, in FIG. 5. By disposing the hollow, gas-filled, bulbous units end-to-end, voids and corners are more easily filled. In addition, the linking of individual units in series tends to make the resultant structure less movable, which enhances working efficiency and improves overall shock absorbing characteristics.

The desirable shape, therefore, for the gas-filled bulbous units of the present invention is one which efficiently fills the void and corner areas in the packing container, completely and efficiently surrounds the packed object and at the same time provides highly efficient shock absorbing characteristics.

Although the trigonal shaped units illustrated in FIGS. 3, 4 and 10 are preferred because it provides increased bulk and shock absorption while preventing the surrounded objects from moving, it should be understood that other shapes capable of achieving the efficient filling and shock absorbing characteristics of the trigonal shape are also useful in the practice of the present invention. Where a smaller diameter cylindrical body is used, for example, a pillow-shaped unit can also prove effective. In such cases heat pressing can be horizontal and horizontal to form the pillow-shaped units or alternatively vertical and vertical, although vertical-vertical arrangements sometimes tend to form irregular seals. Alternatively, the seals may be made at angular variations from horizontal or vertical.

When pre-arranged scores or cuts are made on the heat-pressed portions of the hollow units as shown in FIG. 4, cutting to an optional length is possible without using knives or scissors and hence working efficiency is markedly enhanced. The cuts may include, for example, a sewing stitch-like cut, a slit-like cut, a score line and the like, excepting both ends. The perforations, cuts or score lines may be located at any pressed portion of the resultant packing material, sometimes most desirably at every heat pressed portion and at other times at every other or every fourth pressed portion.

An example of a process useful for producing a shock absorber packing material of the present invention will be explained by referring to FIGS. 1 and 2.

Figure 2:
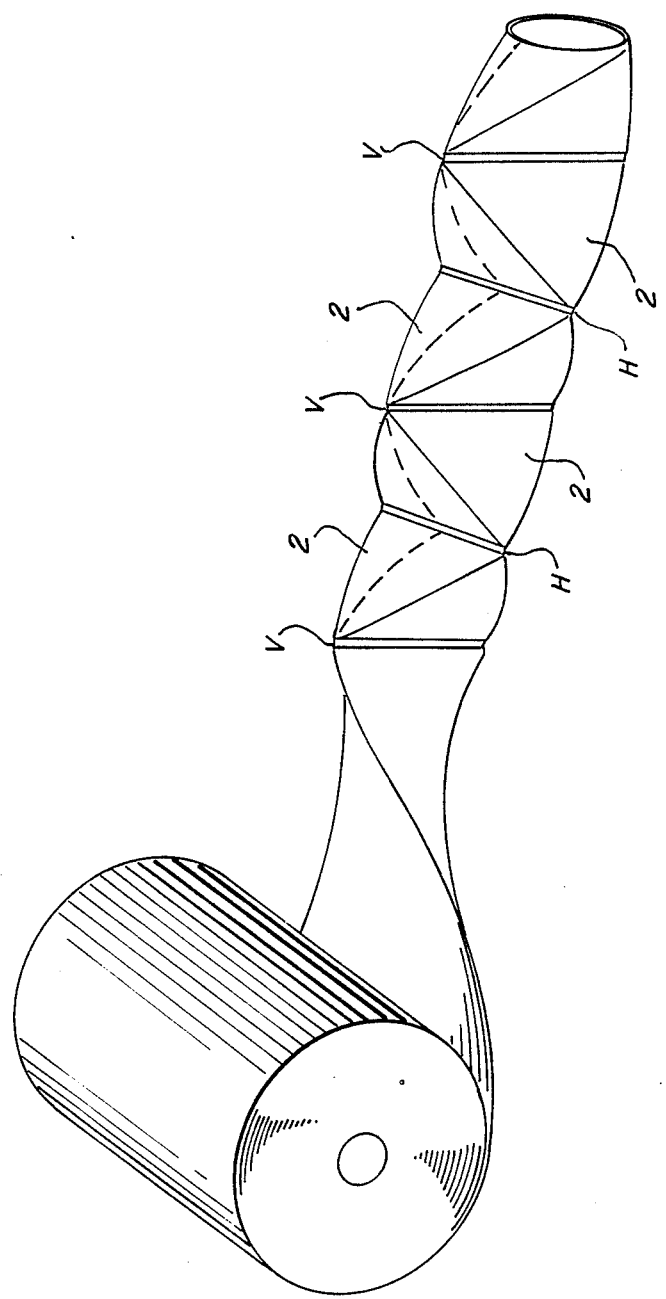

As shown generally in FIG. 1, a laminated film is, at first, prepared in an ordinary manner, then the edges of the laminated film are heat-pressed to form a continuous cylindrical body (1). As shown in FIG. 2, the so obtained cylindrical body (1) is then heat-pressed 1(a) and 1(b) at suitable intervals, as shown for example substantially in vertical (V) and horizontal (H) directions, to thereby obtain a shock absorber of the present invention which comprises a plurality of substantially trigonal-shaped hollow units connected in series. FIG. 3 is a perspective view of an embodiment of the so obtained shock absorber of the present invention. Preferably, the heat-pressing is conducted at a temperature between about 130° C. and about 180° C. under a pressure between about 4 Kg/cm$^2$ and about 10 Kg/cm$^2$ for about 0.3 to about 0.7 seconds.

Ideally, of course, the bulbous, gas-filled units maintain their firm shape and efficient shock absorbing characteristics over a wide range of temperatures to which the packed object is exposed. After air, nitrogen or any other suitable gas is injected and then sealed into the individual units of the shock absorbing packing material, the return to ambient temperatures tends to increase the pressure within the gas-filled units because unit volume is relatively constant, given the relative inelasticity of the plastic film. Thus, as the gas temperature rises so does the pressure. Each hollow gas-filled unit, in the preferred bulbous form, will retain its original expanded shape until the ambient, surrounding temperature is reduced such that the pressure within each unit is reduced below one atmosphere of pressure, e.g. 14.7 psi. Thereafter, the units will lose approximately 10 percent of their volume for each 30° C. reduction in temperature. At the upper limit of temperature, it has been determined that temperatures above about 70° C. are undesirable and set the practical limit on the temperature to which the plastic packing material should be exposed in actual use. Obviously, the units will retain their expanded, fully pressurized condition at temperatures exceeding the ambient temperature at time of manufacture, and as set forth above will decrease in volume at a rate of approximately 10 percent for each 30° C. reduction in temperature below ambient temperature at the time of manufacture. If the volume of the units is reduced below 80 percent of their maximum, expanded volume, the resultant packing material rapidly loses its desired shock absorbing characteristics. This condition is achieved, for example, when the temperature to which the gas-filled units are exposed is about 60° C. or more below the temperature at which the cooled air was injected.

For purposes of illustration only various aspects of embodiments of the present invention will be explained in more detail by way of examples that follow, to which examples the invention itself is in no way limited.

EXAMPLE 1

A laminated film comprising a polyethylene layer "SUMIKASEN (correct spelling is not known)" produced by SUMMITOMO CHEMICAL CO., LTD., having the thickness of 20 microns and a polyester layer "LUMILAR (correct spelling is not known)" produced by TORAY INDUSTRIES, INC. (also known as TOYORO), having the thickness of 12 microns was obtained in an ordinary process. Next, as was shown in FIG. 1, the opposite edges of the laminated film were heat-pressed so as to keep the polyethylene layer inside at the temperature of 150° C. under the pressure of 5 Kg/cm$^2$ to thereby provide a continuous cylindrical body (1), about 6 cm in diameter. The resulting cylindrical body (1) was heat-pressed vertically (V) and horizontally (H), alternately, at an interval of about 7 cm, while blowing air in the cylindrical body. This process forms a shock absorber comprising a plurality of substantially trigonal-shaped units (2) linked in series, each unit having a side of about 9 cm in length as depicted in FIG. 2 and FIG. 3.

EXAMPLE 2

A laminated film was prepared which comprises a polyethylene film "SUMIKASEN" having a thickness of 20 microns and a polyamide film "AMILAN (correct spelling is not known)" produced by TORAY INDUSTRIES, INC., having a thickness of 15 microns. Using the laminated film, a shock absorber was obtained in a similar fashion to the procedure of Example 1, except for the fact that the temperature of air was varied. The results obtained are given in Table I. The above procedure was carried out at about 10° C. under atmospheric pressure.

TABLE I

| Temperature of Injected Air (°C.) | State of the hollow, gas-filled unit when the temperature inside reached the open ambient air temperature (10° C.) |
| --- | --- |
| 10 | Elasticity is poor and shock absorption is not sufficient. |
| 5 | Substantially trigonal shape is maintained but shock absorption is not satisfactory |
| 0 | It becomes close to expected roundish shape, considerably, but sufficient shock absorption is not yet obtained. |
| −5 | It swells to be somewhat hard and shock absorption is virtually satisfactory. |
| −10 | It swells to be hard considerably with good shock absorption. |

EXAMPLE 3

Slit-like cuts or scores (3) were made on the heat-pressed portions (V) and (H) of the shock absorber, prepared in Example 2, in which air cooled to 10° C. below ambient temperature was contained. FIG. 4 shows a perspective view of the shock absorber having contained cooled air therein.

EXAMPLE 4

As set forth above, the shock absorber packing materials of the present invention exhibit the most desirable shock absorbing characteristics when gas-filled at temperatures at least 10° C. and preferably 20° C. below ambient temperature conditions at the time of manufacture. As a further example, the following data indicates the state of the individual gas-filled units at varying temperatures of the filled gas:

TABLE II

| Difference in temperature between ambient air and packed air (°C.) | State of the hollow unit |
| --- | --- |
| 0 | Elasticity is poor and shock absorption is not sufficient. |
| 5 | Substantially trigonal shape is maintained but shock absorption is not satisfactory. |
| 10 | It becomes close to expected roundish shape, considerably, but sufficient shock absorption is not yet obtained. |
| 15 | It swells to be somewhat hard and shock absorption is virtually satisfactory. |
| 20 | It swells to be hard with good shock absorption |

Figure 5:
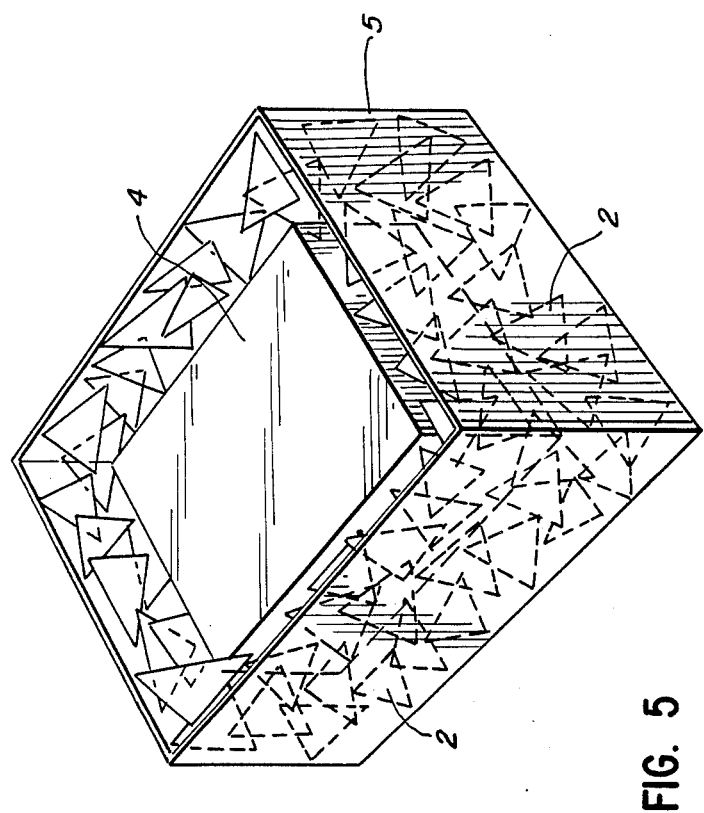
FIG. 5 is a schematic illustration of the manner in which the shock absorber packing material of the present invention can be used to efficiently pack an object.
Figure 6:
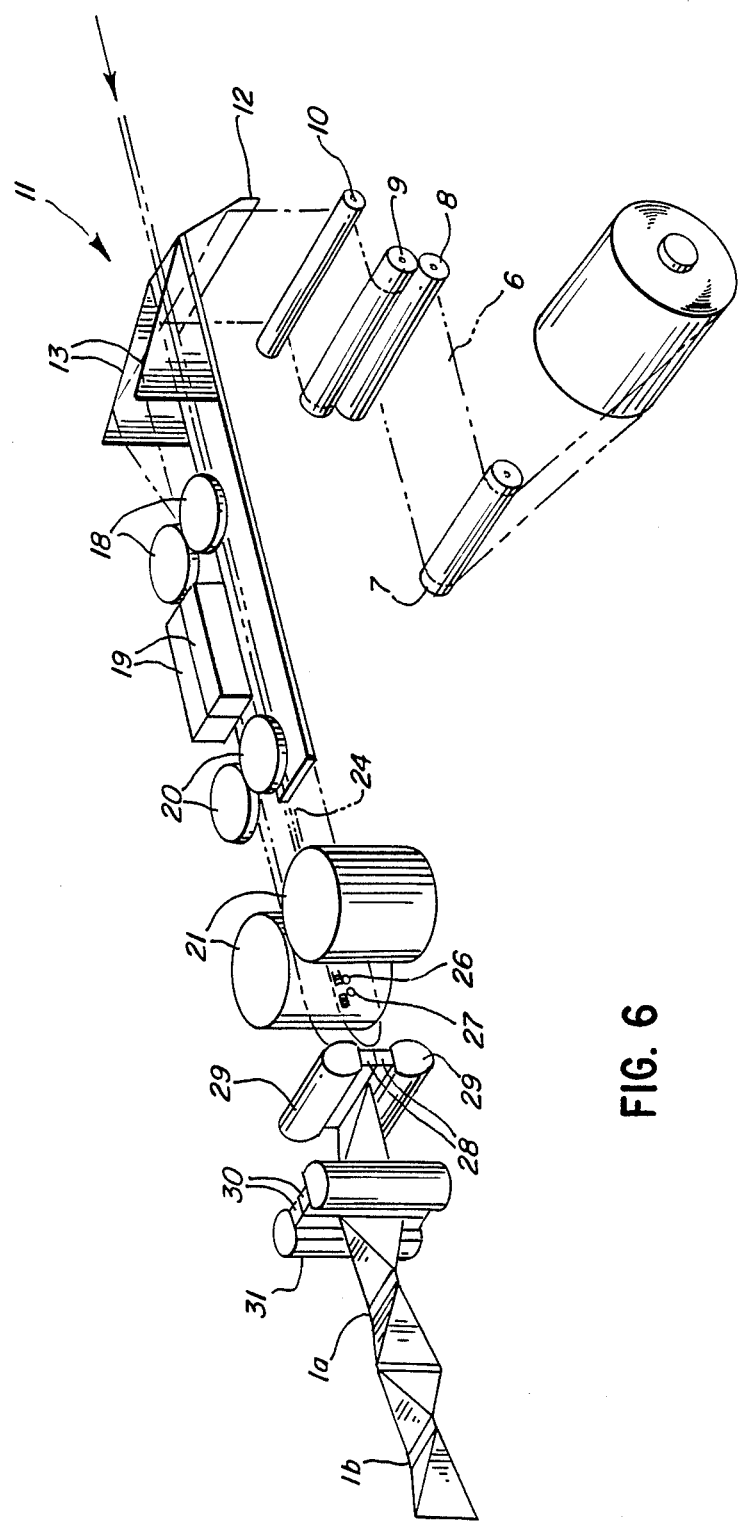
FIG. 6 is a more detailed perspective illustration of a manufacturing process and apparatus for making packing materials of the present invention.

FIG. 5 illustrates the use of the shock absorber packing materials (2) of the present invention. The numeral (4) is an object to be packed, and (5) is a package container in which object (4) is packed. The shock absorber packing material of the present invention has been found to have improved static and dynamic shock absorbing characteristics. For instance, falling tests were performed in which an apparatus weighing 10 Kg, packed in a polycarbonate container with the packing materials of the present invention, was allowed to fall from the height of 60 cm every 90 seconds for 8 hours. Neither deformation nor damage of the packing material was observed with the shock absorbing characteristics unchanged.

As shown in FIGS. 12 and 13 differences in shock absorbing characteristics also result as the temperature of the contained gas is varied during the filling operation. For example, when the packing materials of the present invention are gas-filled at temperatures about 22° C. below ambient temperature (at the time of manufacture) versus 0° C., a difference in the degree of compression of the resultant material takes place when subjected to a 7.5 Kg load, e.g. compression to 15 cm (at a 22° C. differential) versus an increased compression to 12 cm (at a 0° C. differential). In short, the resultant packing material is not capable of withstanding loads (it compresses to a far greater extent) as the gas-fill temperature differential approaches 0° C. Likewise, under the same load conditions, load deformation of packing materials gas-filled at a 22° C. temperature differential (curve A) are smaller than that experienced for packing materials that are gas-filled at a 0° C. temperature differential (curve B). Under identical deformation conditions, moreover, the packing materials that are gas-filled at a 22° C. temperature differential absorb more compressed energy and thus have greater shock absorbing characteristics (FIG. 13).

The resultant shock absorbing packing material, therefore, has the advantages of being an economic filler which is capable of providing high bulk at low cost. It can be made at a working site because of the relative simplicity of the equipment needed for manufacture. In addition, the resultant packing material reduces the problems of static electricity associated with other packing materials, e.g. it does not fly to the ceiling or stick to a person when the package is opened. It can be used repeatedly. And it is easily disposed of simply by piercing the hollow units and allowing the entrapped gas to escape. Moreover, the packing material of the present invention provides all of the highly desirable packing, filling and shock absorbing characteristics described in greater detail above.

As is shown in even greater detail in Table III below the difference in temperature between the ambient air and the packed or injected air (at the time of injection) influences both the volume of the hollow gas-filled unit and the pressure inside each such unit.

TABLE III

| Temperature Difference From Ambient (°C.) | Volume of Injected Air (ml) | Temperature of Ambient Air (°C.) | Theoretical Air Volume At Each Temperature Level (ml) | Volume of Hollow Unit (ml) | Pressure Inside Hollow Unit (atm) |
| --- | --- | --- | --- | --- | --- |
| −10 | 147 | 8 | 157.1 | 148 | 1.061 |
| | | 10 | 158.2 | 149 | 1.062 |
| | | 15 | 161 | 150 | 1.073 |
| | | 20 | 163.8 | 151.5 | 1.081 |
| | | 25 | 166.6 | 152 | 1.096 |
| | | 30 | 169.4 | 153 | 1.107 |
| | | 35 | 172.2 | 153.5 | 1.122 |
| −5 | 147 | 8 | 154.1 | 148 | 1.041 |
| | | 10 | 155.2 | 149 | 1.042 |
| | | 15 | 158 | 150 | 1.053 |
| | | 20 | 160.7 | 151.5 | 1.061 |
| | | 25 | 163.5 | 152 | 1.076 |
| | | 30 | 166.2 | 153 | 1.086 |
| | | 35 | 168.9 | 154 | 1.100 |
| 0 | 147 | 8 | 151.3 | 148 | 1.022 |
| | | 10 | 152.4 | 149 | 1.023 |
| | | 15 | 155.1 | 150 | 1.034 |
| | | 20 | 157.8 | 151.5 | 1.042 |
| | | 35 | 160.5 | 152 | 1.056 |
| | | 30 | 163.2 | 153 | 1.067 |
| | | 35 | 165.8 | 154 | 1.080 |
| +5 | 147 | 8 | 148.6 | 148 | 1.004 |
| | | 10 | 149.6 | 149 | 1.004 |
| | | 15 | 152.3 | 150 | 1.015 |
| | | 20 | 154.9 | 151.5 | 1.022 |
| | | 25 | 157.6 | 152 | 1.039 |
| | | 30 | 160.2 | 153 | 1.047 |
| | | 35 | 162.9 | 153.5 | 1.061 |

Turning now, more specifically, to the desired method and apparatus used to make the shock absorbing packing materials of the present invention, FIGS. 6, 7, 8 and 9, illustrate one embodiment of a machine which performs a line of successive steps to form the shock absorbing packing materials of the present invention. The illustrated machine includes stations at which a film (6) is fed over a guide roller (7) and between a pair of feed rollers (8), (9) toward a second guide roller (10). Film (6) is thereafter guided forward or downline to the next station, a former (11) which forms the film into a tubular member.

Former (11) includes a vertical plate (12) for guiding the film upwardly as well as a table plate at its upper end. Former (11) also includes triangular folding plates (13), (13) extending downline from the upper end of vertical plate (12) for folding the side edges of the film upwardly, and a lower plate (14) for pressing the upper surface of the film (6) which extends downline between folding plates (13), (13).

Figure 7:
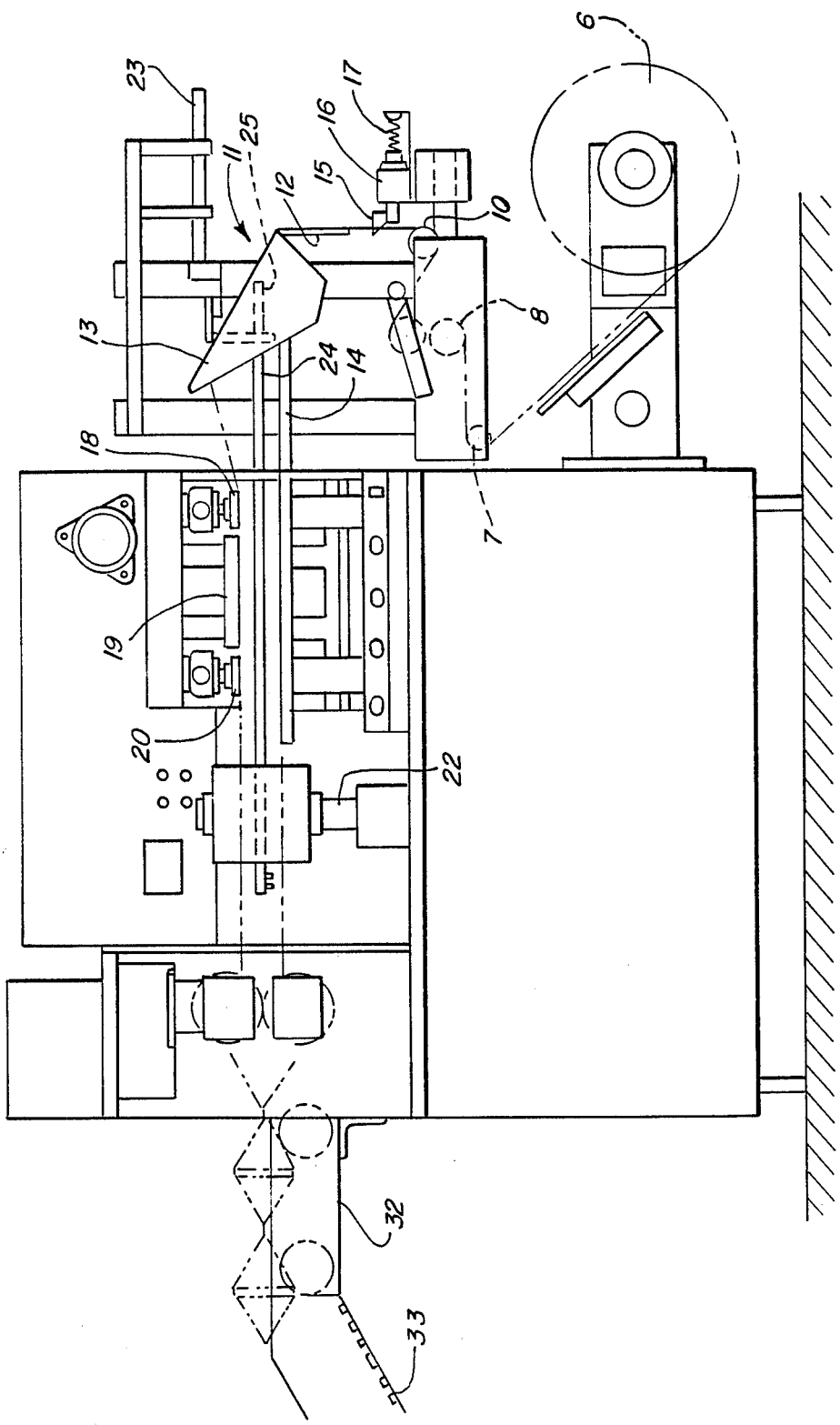
FIG. 7 is a more detailed side view of an apparatus used to make the subject packing materials.
Figure 8:
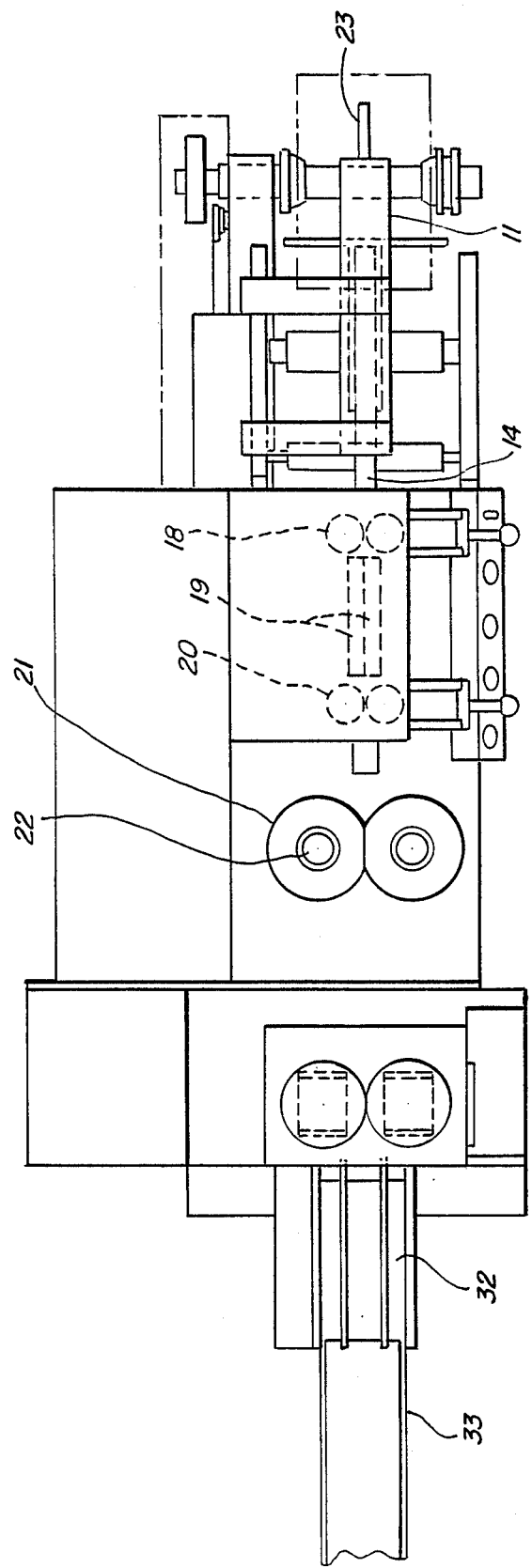
FIG. 8 is a top view of the apparatus of FIG. 7.
Figure 9:
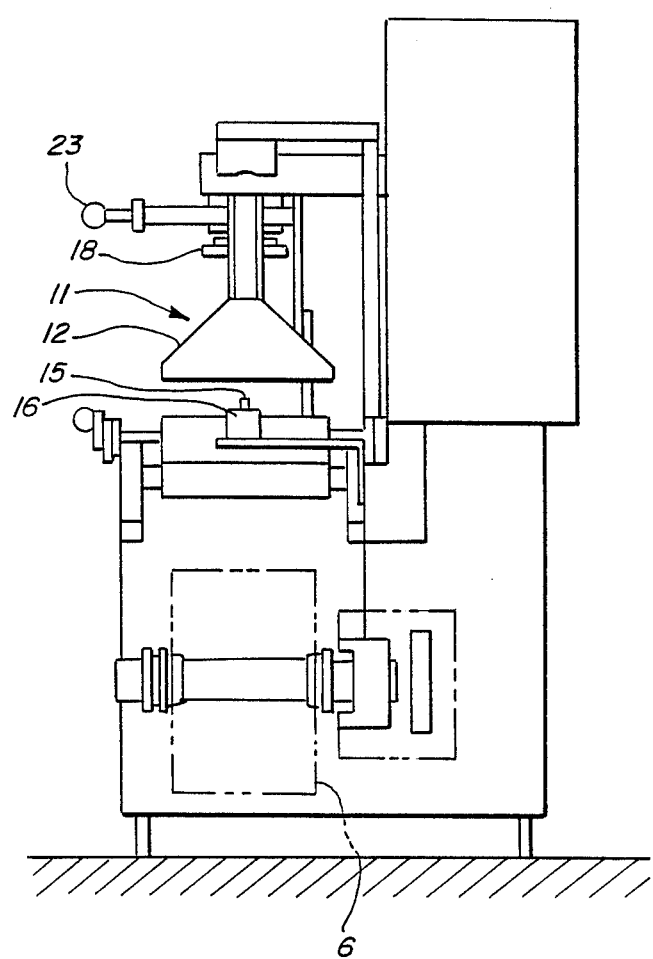
FIG. 9 is an end view of the apparatus of FIG. 7.

As shown in FIG. 7, a cutter (15) and an electrically current actuated solenoid (16) are provided behind vertical plate (12). Cutter (15) is reciprocated by a solenoid (16) allowing the film (6) to be slit as the film is fed a predetermined length. Cutter (15) is biased away from film (6) by a spring (17) and is moved forwardly only when an electric current flows through the solenoid. The solenoid (16) is controlled by an accumulation counter not shown.

A draw roller assembly including draw rollers (18), (18), a heating assembly including preheat bars (19), (19) and a sealing roller assembly including fin seal rollers (20), (20) are positioned in succession and downline respectively, in front and above former (11). Draw rollers (18), (18) draw film (6) downline by gripping the side edges of the film, preheat bars (19), (19) heat seal the film substantially entirely along its length, while fin seal rollers (20), (20) tightly seal the film substantially entirely along its length.

A tubular body advancing assembly including sponge-like rollers (21), (21), is provided to advance film (6). Sponge like rollers (21), (21) are positioned in front of fin seal rollers (20), (20), which are mounted on vertical shafts (22). Rollers (21), (21) grip the side edges of film 6 and advance the film downline in a generally continuous manner. A conduit (23) in communication with a compressor (not shown) is connected to an injection assembly including an injection pipe (24) through an ultra-low temperature generator (25) for cooling air or gas. This generator (25) serves to chill the air preferably to a temperature about 20° C. below the atmospheric temperature when the air or gas is injected into the film. Pipe (24) extends downline above the upper plate (14) and between the sponge-like rollers (21), (21), opening in front of the sponge-like rollers. A pressure detector (26) and a temperature detector (27) are located adjacent to the outlet of the pipe (24) to control the entry of cool air.

A horizontal heat sealing assembly including horizontal sealers (28), (28) having a notching or scoring device, is positioned in front of rollers (21), (21). Each sealer is mounted to a rotatable horizontal shaft (29). A vertical heat sealing assembly including vertical sealers (30), (30) is positioned in front or upline of the horizontal heat sealing assembly. Vertical sealers (30), (30) are mounted to rotatable shafts (31) in a vertically crossing relationship with respect to horizontal sealers (28), (28). A discharge conveyor (32) and a chute (33) are located in front of sealers (30), (30).

In operation, film (6) is unwound by feed rollers (8), (9) and formed into a tubular configuration by former (11). The overlapping edge portions of the tube are heated by the preheat bars (19), (19) to be pressed and tightly sealed by fin seal rollers (20, (20). Thus, pipe (24) is positioned within film (6) in its tubular configuration. The side portions of tubular film (6) are gripped by spongy rollers (21), (21) to advance the tubular body downline for gas introduction and heat sealing. Rollers (21), (21) rotate at a speed which is faster than the feeding speed of film (6) in order to feed the film without sagging.

Pipe (24) which is surrounded by tubular film (6) supplies compressed air which causes the film to bulge and which is sufficiently cooler than the atmosphere within the portion of the tubular film extending beyond sponge-like rollers (21), (21). Rollers (21), (21) also serve to prevent the supplied air from leaking from tubular film (6). The leading end of the sufficiently bulged tubular film (6) is completely sealed by vertical sealers (30), (30) thereafter the film is sealed by horizontal sealers (28), (28).

Horizontal sealers (28), (28), simultaneously notch the sealed or heat-pressed portion (1a), indicated by score line (1b), as illustrated in FIG. 10. By providing the vertical seals (V) and horizontal seals (H) alternately on the film in this manner, a series of trigonal hollow body sections A can be produced, and such bodies are discharged from the device through discharge conveyor (32) and chute (33).

Each time a predeterminated quantity of film (6) is fed, an electric current is supplied to solenoid (16) activating cutter (15) thereby scoring the predetermined film section A. Accordingly, counting of the hollow bulges of tubular film (6), as illustrated by the body sections A, is facilitated due to the completed hollow body sections being sealed and scored at predetermined intervals.

Figure 11:
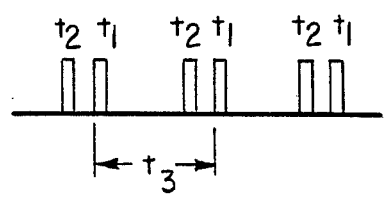
FIG. 11 illustrates the timing sequence for the horizontal and vertical sealers of the illustrated apparatus such that a gas may be injected and held in the formed bulbous, hollow shock absorber units of the packing material.

As can be seen in FIG. 11, operation of this invention is enhanced by the inclusion of a predetermined timing sequence which provides controlled operation of the describe components. As illustrated, time interval $t_3$ is the period of time during which one complete section A is formed and sealed at both ends. Time interval $t_2$ depicts the sealing of one section A of tubular film (6) by vertical sealers (30), (30). Time interval $t_1$ depicts the sealing of the same section A by horizontal sealers (28), (28) which occurs preferably a short period of time after it is sealed by vertical sealers (30), (30). This type of timing sequence allows gas to be entrapped within each section A after it is formed and completely sealed. While a timing sequence which first provides for filling of the tubular film and the subsequent sealing of each section A is described above, it should be understood that a variety of operable specific time intervals (i.e. $t_2$ and $t_3$) are contemplated by the method and machine of this invention.

According to the present invention, a series of shock absorbers in the form of sealed hollow trigonal bodies can be automatically produced. Further, chilled and compressed gas is encapsulated in each of the hollow bodies. This provides the desired increased shock absorbing quality since the encapsulated gas tends to expand at room temperature providing well-swollen shock absorber segment as illustrated by Section A of FIG. 10.

Although horizontal sealers (28), (28) and vertical sealers (30), (30) are illustrated as rotary sealers, a variety of sealers are contemplated. These sealers may include, but are not limited to, sealers having dual cam means and the like which can provide high speed operation of the machine described herein.

It should be understood, of course, that the apparatus, methods and packing materials described above are intended to illustrate embodiments of the invention and do not limit the scope of the invention, which is defined by the claims set forth below. It should also be understood that alteratives to and equivalents of the specific embodiments described can be made and indeed are contemplated without departing from the scope of the invention as defined in the claims set forth below.

What is claimed is:

1. A process for producing a plastic shock absorber for packing comprising the steps of:
   heat sealing plastic film material having at least a two layer wall structure to form a hollow cylindrical body; and
   heat sealing said cylindrical body at alternating horizontal and vertical strips at suitable intervals to create a continuous series of linked, generally trigonal-shaped hollow units while blowing a gas into said cylindrical body, said gas being cooler than the ambient air when injected into said cylindrical body thereby reducing the cooling time of the heat pressed strips and producing swelled, sealed trigonal-shaped units capable of providing efficient shock absorption.

2. The process of claim 1, wherein said plastic film material is a laminated film comprising at least one material selected from the group consisting of polyethylene, polyester and polyamide.

3. The process of claim 1, wherein said gas is air.

4. The process of claim 1, wherein said gas is controlled to be sufficiently cooler than the ambient air when injected into said plastic cylindrical body to create bulbous trigonal-shaped bodies upon being warmed to ambient conditions.

5. The process of claim 4, wherein said gas is controlled to be cooler than the ambient air by at least 10° C.

6. The process of claim 4, wherein said gas is controlled to be cooler than ambient air by at least 15° C.

7. The process of claim 4, wherein said gas is controlled to be cooler than ambient air by at least 20° C.

8. The process of claim 4, including making at least a partial cut on certain of said heat pressed strips.

9. A method of producing a dunnage shock absorber manufactured from plastic film material having a plurality of bulbous units linked in series in which a gas is contained, comprising forming plastic film material into a tubular body, forming a first transverse end heat seal proximate the leading edge of said tubular body thereby closing said end, introducing a gas at least between about 10° C. to about 20° C. below ambient temperature into said portion of said tubular body rearwardly of said first transverse end seal, forming a second transverse end heat seal in said tubular body rearwardly of and spaced from said first transverse heat seal at an angle relative to said first end seal thereby forming a hollow unit between said end seals having gas entrapped therein, introducing a gas at least between about 10° C.

to about 20° C. below ambient temperature into the portion of said tubular body rearwardly of said second end transverse heat seal and forming a third end transverse heat seal in said tubular body rearwardly of said second end transverse heat seal and forming a third end transverse heat seal in said tubular body rearwardly and spaced from said second end transverse seal at an acute angle relative to said second end heat seal corresponding to the acute angle between said first and second end heat seals thereby forming a complimentary shaped hollow unit between said second and third end heat seals having cooled gas entrapped therein.

10. The method of claim 9 wherein said first transverse heat seal is horizontal, said second end heat seal is vertical and said third end heat seal is horizontal.

11. A method for making elongated plastic material having a series of hollow interconnected plastic units with at least a two layer wall structure that contains a gas comprising forming a generally tubular body from at least a two layer plastic film, heat sealing said tubular body at preselected spaced intervals to form a series of successive units, and injecting a gas cooled to temperatures below the ambient temperature into said units before they are sealed to thus form a series of gas-filled bulbous units when said cooled gas returns to ambient temperature.

12. The method of claim 11 wherein heat sealing is carried out at alternating intervals that are in an angular relationship with respect to one another.

13. The method of claim 11 wherein the heat sealing of each end portion of each plastic unit is carried out at an angle of about 90° from each opposing end portion to form a series of generally trigonal-shaped units.

14. The method of claim 13 wherein the heat sealing is carried out at pressures between about 4 and 10 Kg/cm$^2$ for about 0.3 to 0.7 seconds at spaced intervals of about 4 to 10 cm.

* * * * *